United States Patent
Hansen et al.

(10) Patent No.: US 7,561,117 B2
(45) Date of Patent: Jul. 14, 2009

(54) DISPLAY CONTROLLER ARCHITECTURE FOR PORTABLE COMPUTERS

(75) Inventors: Jill Ann Hansen, Chapel Hill, NC (US); Marco Michael Rengan, Chapel Hill, NC (US); Robert Russell Wolford, Durham, NC (US); Richard Joseph Zabelicky, Jr., Raleigh, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 705 days.

(21) Appl. No.: 11/035,498

(22) Filed: Jan. 14, 2005

(65) Prior Publication Data

US 2005/0122277 A1 Jun. 9, 2005

Related U.S. Application Data

(63) Continuation of application No. 10/055,244, filed on Oct. 26, 2001, now Pat. No. 6,873,306.

(51) Int. Cl.
*G09G 5/00* (2006.01)
(52) U.S. Cl. .......... 345/3.1; 345/1.2
(58) Field of Classification Search .......... 345/1.2, 345/3.1, 3.4, 201, 205; 348/555, 563, 706; 710/100, 106
See application file for complete search history.

(56) References Cited

U.S. PATENT DOCUMENTS

| | | | |
|---|---|---|---|
| 5,048,101 A | 9/1991 | Kurosu et al. | 382/305 |
| 5,293,540 A * | 3/1994 | Trani et al. | 348/584 |
| 5,375,210 A | 12/1994 | Monnes et al. | 395/275 |
| 5,694,141 A | 12/1997 | Chee | 345/1 |
| 5,721,565 A | 2/1998 | Nguyen | 345/660 |
| 5,742,274 A | 4/1998 | Henry et al. | 345/698 |
| 5,764,201 A | 6/1998 | Ranganathan | 345/3 |
| 5,880,741 A | 3/1999 | Takeuchi | 345/626 |
| 5,929,924 A | 7/1999 | Chen | 348/552 |
| 6,020,863 A | 2/2000 | Taylor | 345/3.1 |
| 6,028,586 A | 2/2000 | Swan et al. | 345/581 |
| 6,072,541 A | 6/2000 | Song | 348/706 |
| 6,097,441 A | 8/2000 | Allport | 348/552 |
| 6,118,413 A | 9/2000 | Bril et al. | 345/3 |
| 6,166,734 A | 12/2000 | Nahi et al. | 345/335 |
| 6,333,762 B1 | 12/2001 | Yoo et al. | 348/441 |

* cited by examiner

*Primary Examiner*—Amare Mengistu
*Assistant Examiner*—Jennifer Zubajlo
(74) *Attorney, Agent, or Firm*—Sawyer Law Group, P.C.

(57) ABSTRACT

A dual display mode portable computer is disclosed. The portable computer includes a flat-panel display, and a display controller for outputting an internal video signal to the flat panel display. The portable computer further includes means for receiving an external video signal, and a multiplexer for outputting the internal video signal to the flat-panel display during a first display mode, and for outputting the external video signal to the flat-panel display during a second display mode, thereby enabling the portable computer to act as a display device for an external computer.

12 Claims, 3 Drawing Sheets

DISPLAY CONTROLLER ARCHITECTURE FOR PORTABLE COMPUTERS

CROSS-REFERENCE TO RELATED APPLICATIONS

The present invention is a Continuation Application of U.S. application Ser. No. 10/055,244 entitled "Display Controller Architecture for Portable Computers" filed on Oct. 26, 2001 now U.S. Pat. No. 6,873,306 and incorporated herein by reference.

FIELD OF THE INVENTION

The present invention relates to portable computers, and more particularly to a display controller architecture for portable computers.

BACKGROUND OF THE INVENTION

Laptops and notebooks are names for portable computers that have a flat screen and usually weigh less than eight pounds. Most portable computers have connectors for an external monitor and keyboard for transforming them into desktop computers.

FIG. 1 is a block diagram illustrating current display technology found in portable computers. Like most computer systems, a portable computer 10 includes internal hardware and software 12 for operating the system, and a display controller 14 for outputting an internal video signal 16 to a flat panel display 18. The portable computer 10 also includes a digital-to-analog converter 20 and an external CRT connector 22 for outputting the video signal 16 to an external monitor, such as a cathode ray tube (CRT) (not shown). With this type of display architecture, the portable computer 10 is capable of outputting its video signal on the flat-panel display 18, on the external CRT, or on both the flat-panel display 18 and the external CRT at the same time.

The flat-panel display 18 tends to be one of the most expensive components of the portable computer 10. Yet, today many portables 10 become obsolete because various components, such as the processor, deliver lackluster performance relative to new computer systems. Therefore, it would be desirable to continue using the flat-panel display 18 even after that portable computer 10 has become obsolete, perhaps as the monitor of a desktop PC (assuming the desktop PC has a dual display adapter card). The problem is that today's portable computers 10 can only output video signals, but cannot receive video signals from an external source for display on the flat-panel 18.

Accordingly, what is needed is a display controller architecture for portable computers that allows portable computers to display external video signals. The present invention addresses such a need.

SUMMARY OF INVENTION

The present invention provides a dual display mode portable computer. The portable computer includes a flat-panel display, and a display controller for outputting an internal video signal to the flat panel display. The portable computer further includes means for receiving an external video signal, and a multiplexer for outputting the internal video signal to the flat-panel display during a first display mode, and for outputting the external video signal to the flat-panel display during a second display mode, thereby enabling the portable computer to act as a display device for an external computer.

DETAILED DESCRIPTION

The present invention relates to display controller architecture for portable computers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a display architecture for portable computers that allows portable computers to receive and display the output of a desktop PC or another portable computer.

Figure 1:
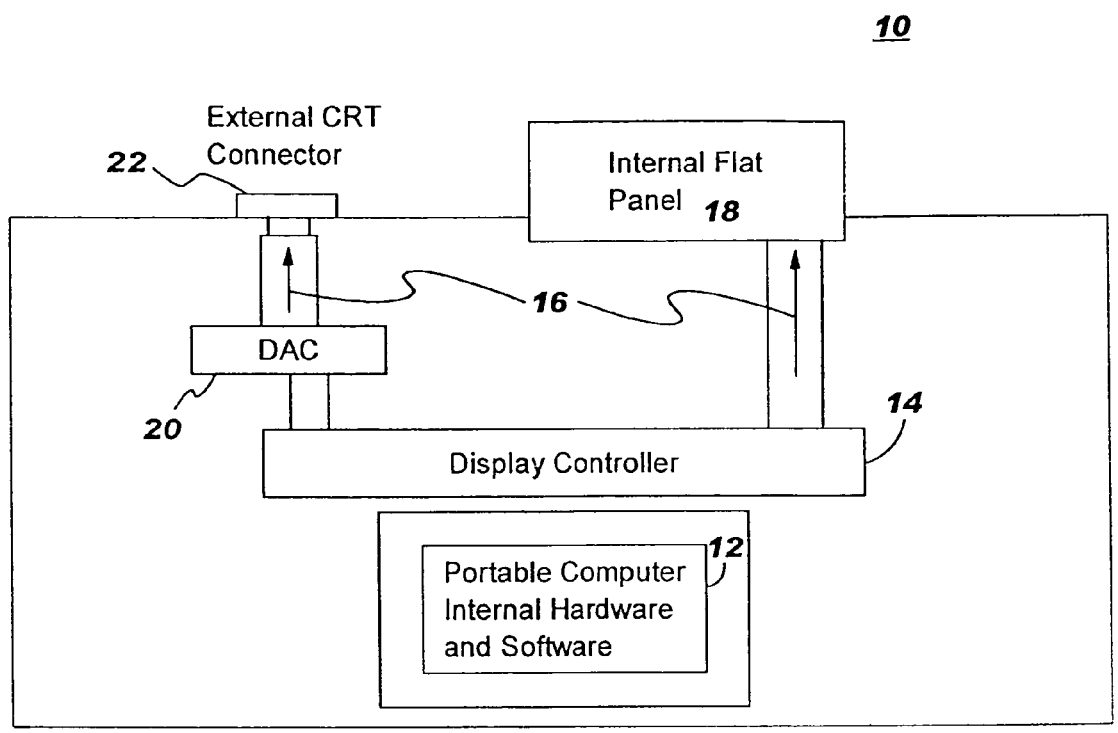
FIG. 1 is a block diagram illustrating current display technology found in portable computers.
Figure 2:
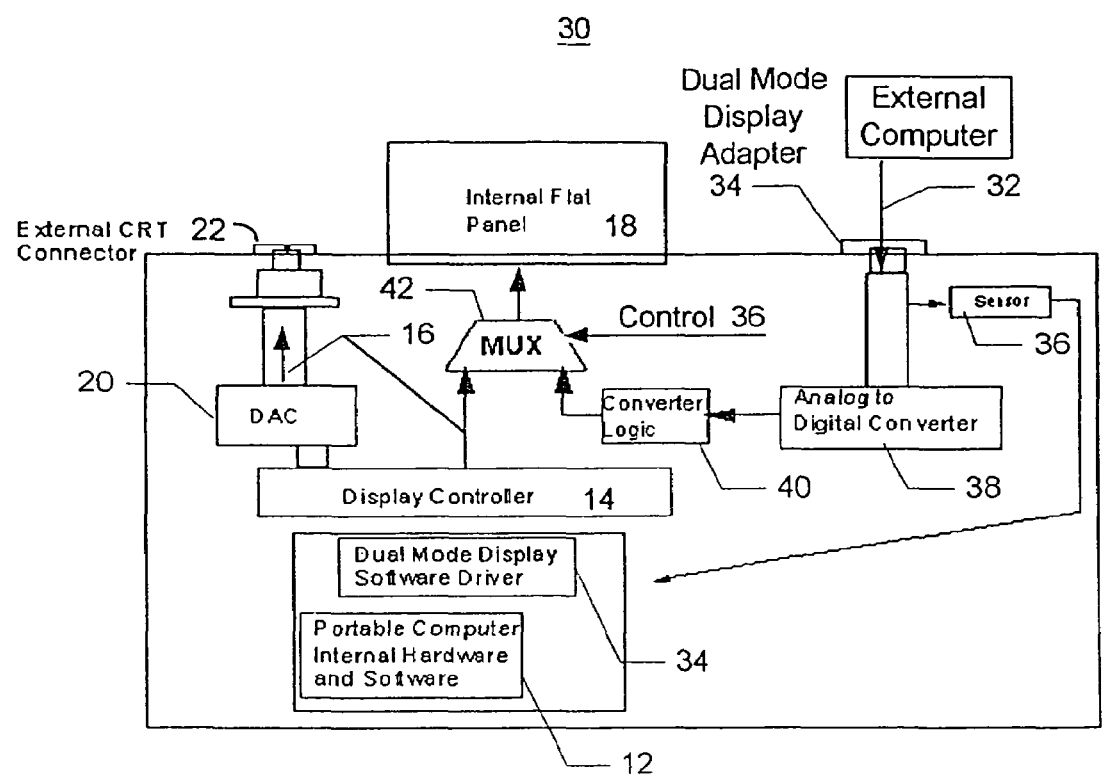
FIG. 2 is a block diagram illustrating the display controller architecture in accordance with one embodiment of the present invention.

FIG. 2 is a block diagram illustrating the display controller architecture in accordance with one embodiment of the present invention, where like components from FIG. 1 have like reference numerals. According to the present invention, the portable computer 30 is provided with an extended mode display (XMD) that enables the portable computer 30 to operate dual display modes. In normal display mode, the portal computer 30 displays the internal video signal 16 on the flat-panel display 18, while in XMD mode, the portable computer 30 receives and displays an external video signal 32 on the flat-panel display 18.

In the first embodiment of the present invention, the display controller architecture includes a dual mode display connector 34, a sensor 36, an analog-to-digital (A/D) converter 38, converter logic 40, and a multiplexer 42. In a preferred embodiment, the dual mode display connector 34 is a 15-pin RGB connector for coupling a video cable from an external PC or portable to the portable computer 30. The external video signal 32 preferably comprises RGB analog input and timing signals.

When the external video signal 32 is received on the connector 34, the A/D converter 38 converts the signal 32 into a digital signal. The converter logic 40 then maps the output of the A/D converter 38 into a format required by the flat panel display 18. After the conversion, the formatted digital video signal is input into the multiplexer 42. The multiplexer 42 has two inputs: the standard internal video signal 16 from the display controller 14, and the external video signal 32 output from converter logic 40. The multiplexer 42 outputs either the internal video signal 16 or the external video signal 32 to the flat-panel display 18 depending on the current display mode of the portable computer 30.

In a preferred embodiment, controls are added to the portable computer BIOS that would enable the portable computer 30 to operate in the following modes:

1) normal display mode—flat-panel only,
2) normal display mode—flat-panel and an external CRT (same image on both displays),
3) normal display mode—external CRT only, and 4) XMD mode—external signal displayed on external CRT and flat-panel.

In a preferred embodiment of the present invention, the display modes of the portable computer can be controlled in a variety of ways including automatic detection or by an explicit user command. The automatic mode requires the sensor 36 to automatically detect an external device coupled to the dual mode display connector 34 and driving the external video signal 32 through the connector 32 when the portable computer 30 is powered-on. This can be an extension of the power-on sequence of the portable computer 30. Alternatively, if the portable computer 30 and the external computer are already powered-on and the two are connected, it is possible for both computers to detect each other. In this case, the user may be given an option to select a "hot plug" mode. In any event, once the sensor 36 detects the external video signal 32, the portable computer 30 may be switched to XMD mode.

The second method for controlling the display modes of the portable computer 30 is through the use of a dual mode display software driver 34 that enable the user to manually invoke the XMD mode either by clicking on an icon or by a key sequence. In a preferred embodiment, the dual mode display driver 34 displays a dialog box at startup that allows the user to select automatic switching mode or manual switching mode. The driver 34 may also give the user an option to select the resolution of the external computer (e.g., VGA, XVGA, or SVGA) when it cannot automatically be detected.

The manual method for switching the display mode is preferable over the automatic detection method because the user can toggle the display between the primary flat-panel display 18 and the external PC. More specifically, the portable computer 30 remains on and fully booted even when the flat-panel 18 is used as the second display device of the external PC, and a hot key sequence is used to toggle flat-panel display 18.

Once the display mode of the portable computer 30 is set, a control signal 36 is sent to the multiplexer 42 to control which video signal is sent to the flat-panel display 18. If the portable computer 30 is in normal display mode, then the multiplexer 14 outputs the internal video signal 16 to the flat-panel display 18. If, however, the portable computer 30 is in the XMD mode, the multiplexer 42 outputs the external video signal 32 to the flat-panel display 18. A primary advantage of using the multiplexer-based display architecture is that multiplexer 42 eliminates the need for a custom graphics controller, and the display architecture can be implemented into current portable computer designs.

Figure 3:
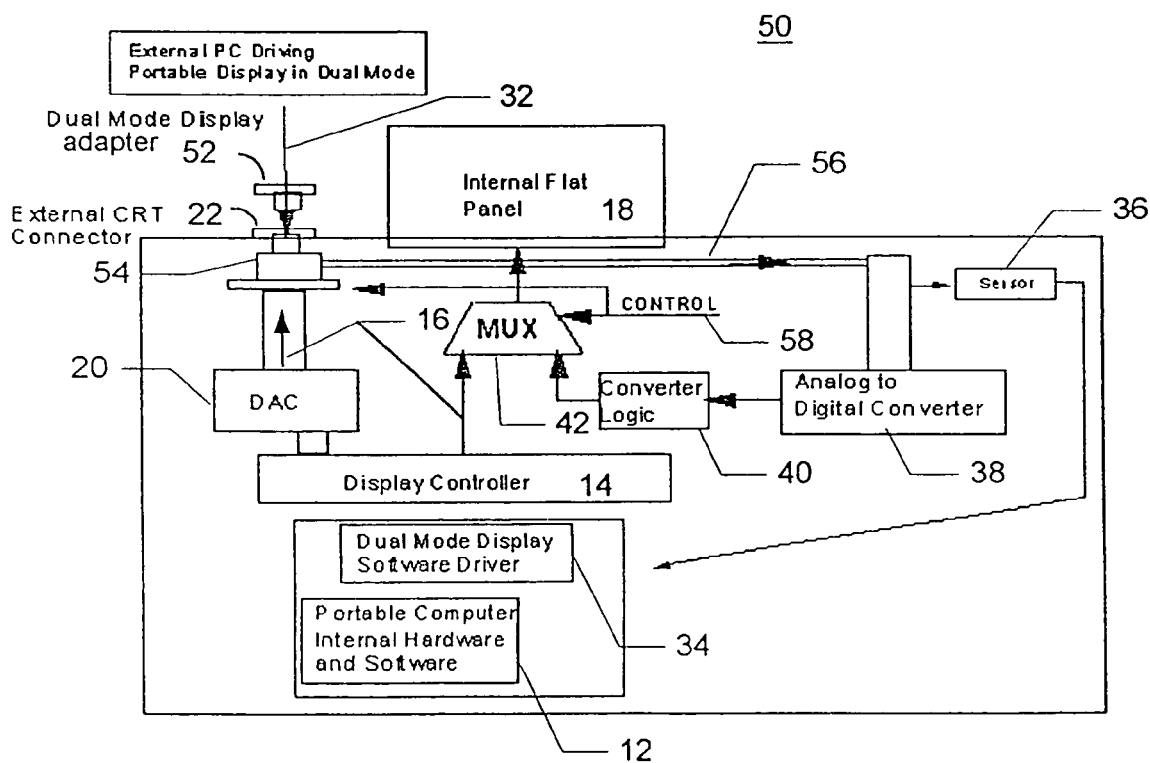
FIG. 3 is a block diagram illustrating a display controller architecture in accordance with a second preferred embodiment of the present invention.

Referring now to FIG. 3, a display controller architecture is shown according to a second preferred embodiment of the present invention, where like components from FIGS. 1 and 2 have like reference numerals. The second embodiment adds a dual mode display connector 52 to the existing external CRT connector 22 of the portable computer 50 that connects to the external CRT connector 22, rather than adding a new connector to the portable computer. The CRT connector 22 is a female type connector. Therefore, the dual mode display connector 52 is a female to male type connector for accepting a display cord from another computer. The advantage of using the dual mode display connector 52 is that current portable computers do not have to be redesigned to accept a new input connector.

According to the second embodiment, a second multiplexer 54 is connected between the external CRT connector 22 and the D/A converter 20. In normal display mode, the D/A converter 20 outputs the internal video signal that drives an external CRT to the external CRT connector 22. In XMD mode, a control signal 56 is sent to the second multiplexer 54 to isolate the D/A converter 20 and to allow the external video signal 32 to enter the external CRT connector 22 through the dual mode display connector 52. The external video signal 32 is then input to the A/D converter 38 and converter logic 40, and output to the flat-panel display 18 through the multiplexer 42, as described above.

A display architecture that provides portable computers with an extended mode display has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended aims.

What is aimed is:

1. A portable computer comprising:
   a flat-panel display;
   a display controller for outputting an internal video signal to the flat panel display;
   means for receiving an external video signal;
   a multiplexer for outputting either the internal video signal or the external video signal to the flat-panel; and
   an analog-to-digital converter and converter logic courled between the receiving means and the multirlexer for converting the external video signal into a format required by the flat-panel display.

2. The portable computer of aim 1 wherein the receiving means includes a sensor for automatically sensing the external video signal and causing the multiplexer to output the external video signal for display.

3. The portable computer of aim 2 wherein receiving means includes a software driver that enables a user to manually select between displaying the internal video signal or the external video signal.

4. The portable computer of aim 3 wherein the receiving means includes a dual mode display connector coupled to the analog-to-digital converter for receiving the external video signal.

5. The portable computer of aim 3 wherein the portable computer includes an external ORT connector and wherein the receiving means includes a dual mode display adapter coupled to the external ORT connector for accepting the external video signal.

6. The portable computer of aim 5 wherein the portable computer further includes a second multiplexer coupled between the external ORT connector and a digital-analog-converter for isolating the output of the digital-analog-converter so that the external video signal may be received through the dual mode display adapter and the external ORT connector.

7. A method for enabling a portable computer to display an external video signal, the portable computer having a flat-panel display, the method comprising:
   (a) providing the portable computer with means for receiving the external video signal, including coupling an analog-to-digital converter and converter logic between the receiving means and the multiplexer for converting the external video signal into a format required by the flat-panel display;
   (b) inputting an internal video signal to a multiplexer;
   (c) inputting the external video signal to the multiplexer; and
   (d) providing the portable computers with dual display modes, such that in a first display mode, the multiplexer outputs the internal video signal to the flat-panel display, while in a second display mode, the multiplexer outputs the external video signal to the flat-panel display, thereby enabling the portable computer to act as a display device for an external computer.

8. The method of aim 7 wherein step (a) further includes the step of: providing the receiving means with a sensor for automatically sensing the external video signal and causing the multiplexer to output the external video signal for display.

9. The method of aim 8 wherein step (a) further includes providing the receiving means with a software driver enables a user to manually select between displaying the internal video signal or the external video signal.

10. The method of aim 9 wherein step (a) further includes coupling a dual mode display connector to the analog-to-digital converter for receiving the external video signal.

11. The method of aim 11 wherein the portable computer includes an external CRT connector and wherein step (a) further includes coupling a dual mode display adapter to the external ORT for accepting the external video signal.

12. The method of aim 11 wherein step (a) further includes coupling a second multiplexer between the external CRT connector and a digital-analog-converter for isolating the output of the digital-analog-converter so that the external video signal may be received through the dual mode display adapter and the external ORT connector.

\* \* \* \* \*